United States Patent
Sugiyama

(10) Patent No.: US 9,936,172 B2
(45) Date of Patent: Apr. 3, 2018

(54) SIGNAL PROCESSING DEVICE, SIGNAL PROCESSING METHOD, AND SIGNAL PROCESSING PROGRAM FOR PERFORMING COLOR REPRODUCTION OF AN IMAGE

(71) Applicant: SONY CORPORATION, Tokyo (JP)

(72) Inventor: Toshinobu Sugiyama, Kanagawa (JP)

(73) Assignee: SONY CORPORATION, Tokyo (JP)

(*) Notice: Subject to any disclaimer, the term of this patent is extended or adjusted under 35 U.S.C. 154(b) by 270 days.

(21) Appl. No.: 14/430,638

(22) PCT Filed: Oct. 24, 2013

(86) PCT No.: PCT/JP2013/078831
§ 371 (c)(1),
(2) Date: Mar. 24, 2015

(87) PCT Pub. No.: WO2014/073386
PCT Pub. Date: May 15, 2014

(65) Prior Publication Data
US 2015/0256800 A1     Sep. 10, 2015

(30) Foreign Application Priority Data

Nov. 7, 2012   (JP) ................. 2012-245697

(51) Int. Cl.
*H04N 5/374*     (2011.01)
*H04N 9/04*      (2006.01)
(Continued)

(52) U.S. Cl.
CPC ............ *H04N 9/045* (2013.01); *H04N 5/347* (2013.01); *H04N 5/372* (2013.01); *H04N 5/374* (2013.01);
(Continued)

(58) Field of Classification Search
CPC ........ H04N 5/347; H04N 5/372; H04N 5/374; H04N 9/045; H04N 9/077; H04N 9/643; H04N 9/77; H04N 9/735
See application file for complete search history.

(56) References Cited

U.S. PATENT DOCUMENTS 6,211,521 B1   4/2001  Bawolek et al.
6,825,470 B1   11/2004 Bawolek et al.
(Continued)

FOREIGN PATENT DOCUMENTS

JP   2001-69519 A    3/2001
JP   2002-142228 A   5/2002
(Continued)

OTHER PUBLICATIONS

International Search Report dated Jan. 28, 2014 in PCT/JP2013/078831.

*Primary Examiner* — Antoinette Spinks
(74) *Attorney, Agent, or Firm* — Oblon, McClelland, Maier & Neustadt, L.L.P.

(57) ABSTRACT

The present disclosure relates to a signal processing device, a signal processing method, and a signal processing program which can more accurately perform color reproduction to an image captured by using visible light and infrared light.
A plurality of pixel signals, output by a color-difference sequential system from an image sensor on which light having passed through a color filter array including a plurality of complementary color filters is incident, are acquired. With respect to the plurality of pixel signals, a parameter to eliminate a term corresponding to a predetermined infrared wavelength in an equation to calculate a color-difference signal from the plurality of pixel signals, is set using the plurality of pixel signals. Thereafter, a luminance signal obtained by performing an addition process of the plurality of pixel signals and a color-difference signal (Continued)

obtained by performing a subtraction process between the plurality of pixel signals are calculated using the parameter.

18 Claims, 10 Drawing Sheets

(51) Int. Cl.
    *H04N 5/347*     (2011.01)
    *H04N 5/372*     (2011.01)
    *H04N 9/077*     (2006.01)
    *H04N 9/64*     (2006.01)
    *H04N 9/77*     (2006.01)
    *H04N 9/73*     (2006.01)

(52) U.S. Cl.
    CPC .............. *H04N 9/077* (2013.01); *H04N 9/643* (2013.01); *H04N 9/735* (2013.01); *H04N 9/77* (2013.01)

(56) References Cited

U.S. PATENT DOCUMENTS

| | | | |
|---|---|---|---|
| 2008/0283729 A1* | 11/2008 | Hosaka | H04N 5/332 250/208.1 |
| 2010/0231770 A1* | 9/2010 | Honda | G06T 3/4015 348/308 |
| 2010/0283866 A1 | 11/2010 | Numata | |
| 2011/0019004 A1* | 1/2011 | Ohmori | H04N 9/045 348/164 |
| 2016/0182837 A1* | 6/2016 | Shiokawa | H04N 9/045 348/164 |

FOREIGN PATENT DOCUMENTS

| | | |
|---|---|---|
| JP | 2002-521975 A | 7/2002 |
| JP | 2005-130317 A | 5/2005 |
| JP | 2005-341470 A | 12/2005 |
| JP | 2008-289001 A | 11/2008 |
| JP | 2011-50049 A | 3/2011 |

\* cited by examiner

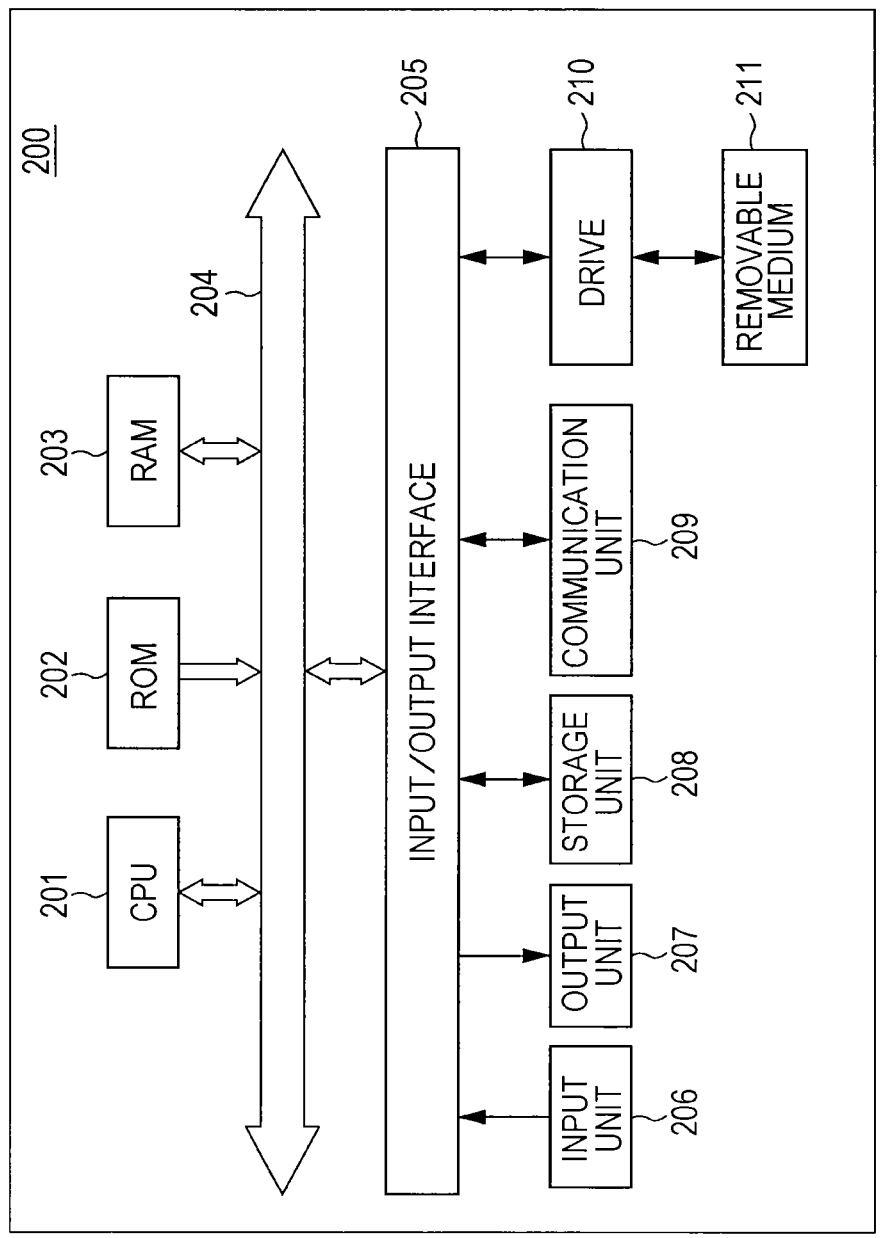

SIGNAL PROCESSING DEVICE, SIGNAL PROCESSING METHOD, AND SIGNAL PROCESSING PROGRAM FOR PERFORMING COLOR REPRODUCTION OF AN IMAGE

TECHNICAL FIELD

The present disclosure relates to a signal processing device, a signal processing method, and a signal processing program which are suitably applicable to an image capturing device, such as a surveillance camera and a civilian camcorder which capture an image at nighttime based on infrared light irradiation.

BACKGROUND ART

A surveillance camera has generally two functions which are a day mode to capture an image at daytime and a night mode to capture an image at nighttime. The day mode is a function to capture a normal color image. On the other hand, in the night mode, in order to capture an image in a dark environment at nighttime, infrared light (infrared ray) is projected and the reflected light thereof is captured. In this manner, even in environment with no visible light, it is possible to acquire a clear image (hereinafter referred to as an infrared image).

However, in capturing image by infrared light unlike visible light, color information cannot be acquired. Therefore, the image is generally displayed on a display device in a monochrome of gray or green based on the brightness of infrared light.

On the other hand, a surveillance camera is used to monitor a suspicious person or a suspicious object in a surveillance area. In order to identify them, the color information, such as colors of person's clothes and a vehicle, is extremely important. However, when the image is captured by the normal color mode at dark time, such as nighttime, noise and the signal intensity of an object are at the same level and it is difficult to distinguish them.

To solve these problems, the above mentioned night mode by infrared light irradiation is used. However, the image obtained by infrared light irradiation is a monochrome image in which the color of the object cannot be distinguished, whereas the image is as clear as that captured at daytime.

Furthermore, in addition to a surveillance camera, a digital video camera, a camcorder and the like have the function to capture an image at dark time by infrared light irradiation. In such devices, it is required to color the infrared image to obtain a natural image.

With regard to the above described problems, Patent Document 1, for example, discloses a technique for adding colors to the infrared image when there is no visible light due to environment. With the technique, three types of infrared light having a different wavelength is used as infrared light to be projected on an object to estimate the color of the object based on the difference (correlation) between reflection characteristics of infrared light by a substance (resin) and reflection characteristics of visible light by the substance. However, with this technique, by using a plurality of light sources and spectral systems thereof, it is likely to increase in cost and the color estimation accuracy is not sufficiently high.

On the other hand, when visible light which slightly remains in environment is used, it is possible to perform color reproduction to some extent with a conventional camera system by devising a method of a signal process. As an example of the technique, in a digital camera, a technique for reproducing natural colors on an image captured by projecting infrared light at dark time (night shot) is proposed (for example, see Patent Document 2). In the technique, when the camera detects that the camera system is changed to a night mode, a parameter table different from the one used in a normal color image capturing mode is used. The parameter table is used for a white balance adjustment. An appropriate color reproduction is thereby performed even when visible light and infrared light are mixed.

CITATION LIST

Patent Literature

Patent Literature 1: Japanese Patent Application Laid-Open No. 2011-50049
Patent Literature 2: Japanese Patent Application Laid-Open No. 2005-130317

SUMMARY OF THE INVENTION

Problems to be Solved by the Invention

However, with the technique, since a similar process to the normal color signal process is performed to mixed signal including components of visible light and infrared light, color shift due to the infrared signal component and coloring an entire screen and the like are caused and it is difficult to correctly perform color reproduction. Moreover, it is not adequate considering the robustness (resistance against an environmental change) under various light sources.

In the above described situation, a technique for more correctly performing color reproduction to an image captured by using visible light and infrared light has been desired.

Solutions to Problem

In an aspect of the present disclosure, first, a plurality of pixel signals output by a color-difference sequential system are acquired from an image sensor on which light, which has passed through a color filter array including a plurality of complementary color filters, is incident. Then, a parameter to eliminate a term corresponding to a predetermined infrared wavelength in an equation to calculate a color-difference signal from the plurality of pixel signals is set with respect to the plurality of pixel signals. Thereafter, a luminance signal, obtained by performing an addition process of the plurality of pixel signals, and the color-difference signal, obtained by performing a subtraction process between the plurality of pixel signals, are calculated using the equation to which the parameter is applied.

In another aspect of the present disclosure, first, a plurality of pixel signals output from an image sensor, on which light having passed through a color filter array including a plurality of primary color filters is incident, are acquired. Then, a parameter to eliminate a term corresponding to a predetermined infrared wavelength in an equation to calculate a color-difference signal from the plurality of pixel signals is set with respect to the plurality of pixel signals.

Thereafter, the plurality of pixel signals are converted into a luminance signal obtained by performing an addition process of the plurality of pixel signals, and the color-difference signal obtained by performing a subtraction process between the plurality of pixel signals, using the equation to which the parameter is applied.

In an aspect and the other aspects of the present disclosure, in an equation to calculate a color-difference signal from a plurality of pixel signals output from an image sensor, a parameter to eliminate a term corresponding to a predetermined infrared wavelength is set. By using the equation, it is possible to exclude a signal component corresponding to the target infrared wavelength from the color-difference signal.

Effects of the Invention

In at least one of embodiments according to the present disclosure, it is possible to improve color saturation and hue reproduction accuracy and to perform more accurately color reproduction with respect to an image captured by using visible light and infrared light.

BRIEF DESCRIPTION OF DRAWINGS

FIG. 3A shows a wavelength of light used in capturing an image in the night mode, and FIG. 3B shows spectral transmission characteristics of an IR cut filter.

FIG. 10 is a block diagram showing an exemplary configuration of hardware of a computer.

MODE FOR CARRYING OUT THE INVENTION

Figure 1:
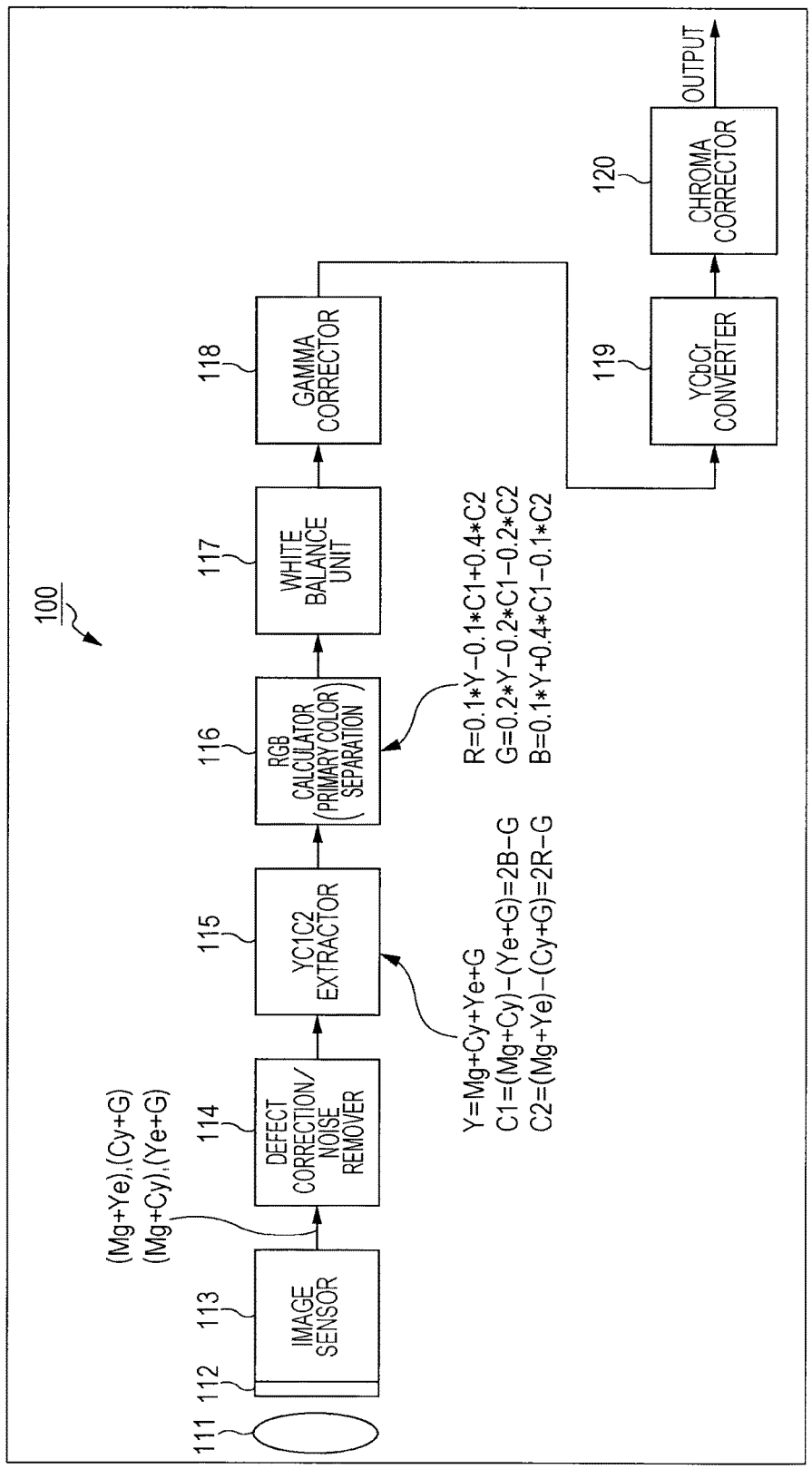
FIG. 1 is a functional block diagram showing an exemplary configuration of an image capturing device using an image sensor equipped with a conventional complementary color filter.

Hereinafter, examples of configurations to implement the techniques (hereinafter referred to as "embodiments") of the present disclosure will be described. In the specification and the drawings, a redundant description is omitted by assigning the same reference numerals to the configuration components having the substantially same functions or configurations. The order of the description is as follows:

1. Introductory description
2. First embodiment (a signal processor: an example of the embodiment applied to an image sensor equipped with a complementary color filter)
3. Second embodiment (a signal processor: an example of the embodiment applied to an image sensor equipped with a primary color filter)
4. Third embodiment (a signal processor: an example of the embodiment equipped with a noise reducer)
5. Fourth embodiment (an example of the case when only environmental infrared light exists)

1. Introductory Description

The present disclosure is a technique which can more accurately perform color reproduction under various light sources in a signal processing device colorizing an infrared ray irradiation image captured by a night mode under environment where visible light slightly remains.

Hereinafter, before the technique of the present disclosure is described, a current technique for performing color reproduction to an image captured by using projected infrared light under a dark environment will be described. For example, in the image capturing device using an image sensor equipped with a color filter array (color separation filter) including a plurality of complementary color filters, problems caused when mixed signal including the components of the visible light and the infrared light is processed with a conventional signal processing procedure and the signal processing will be described. In the following description, the color filter array including the plurality of complementary color filters is also referred to as a color separation filter.

Figure 2:
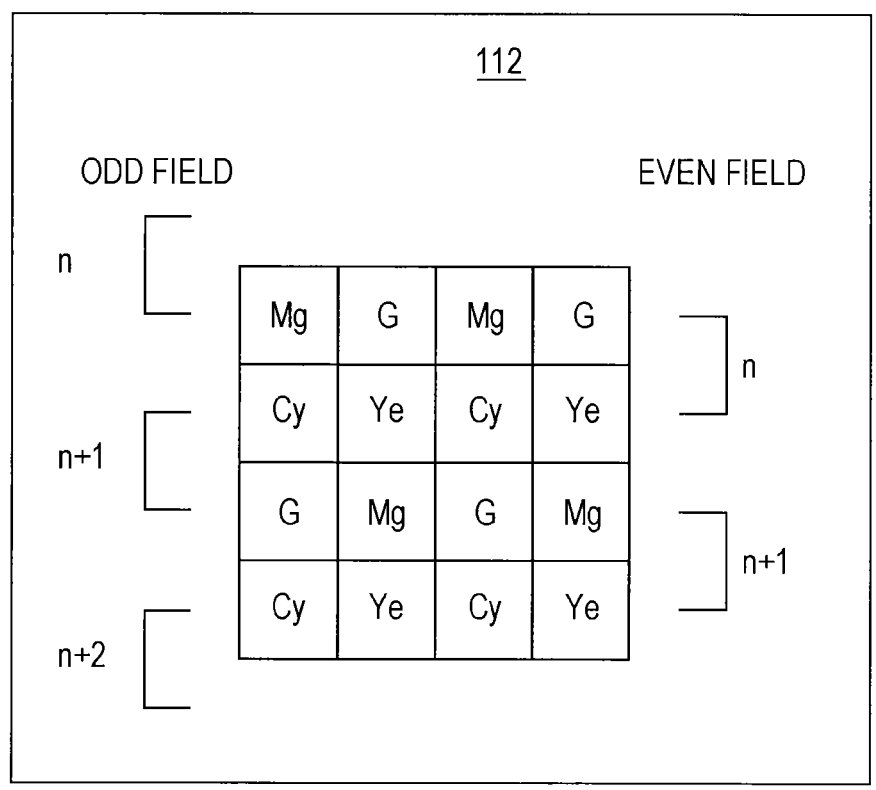
FIG. 2 is a diagram to illustrate the complementary color filter with which the image sensor is equipped.

FIG. 1 is a functional block diagram showing an exemplary configuration of the image capturing device using the image sensor equipped with the conventional complementary color filters. FIG. 2 is a diagram to illustrate the complementary color filters.

An image capturing device 100 shown in FIG. 1 is a camera system, such as a general surveillance camera and a general digital camera, using a color-compensate-type image sensor 113 including a color filter array 112 disposed on the front surface. On the color filter array 112 shown in FIG. 2, four colors, i.e. yellow (Ye), cyan (Cy), magenta (Mg), and green (G), of the complementary color filters are arranged on the predetermined position.

The image capturing device 100 includes an optical lens 111, the image sensor 113 on the front surface of which the color filter array 112 is disposed, a defect correction/noise remover 114, a YC1C2 extractor 115, and an RGB calculator 116. Furthermore, the image capturing device 100 includes a white balance unit 117, a gamma corrector 118, a YCbCr converter 119, and a chroma corrector 120.

The image sensor 113 photoelectrically converts each color component light which has passed through the complementary color filter of the color filter array 112, using a photoelectric conversion element corresponding to each pixel, and outputs the converted signal as the pixel signal. An imaging element using a CCD, a CMOS, and the like is applicable to the image sensor 113. Generally, the image sensor 113 equipped with the color filter array 112 adopts a color-difference sequential system for reading signals to enable interlaced reading in the NTSC system. In the color-difference sequential system, pixel data is read from the image sensor 113 after the pixels adjacent in perpendicular direction are added with each other. At this time, reading of the odd interlaced field is performed with one row shifted from reading of the even interlaced field. For example, in the even field, signals of (Mg+Cy) and (Ye+G) and signals of (Cy+G) and (Mg+Ye) are thereby alternately output every other row.

As shown in FIG. 1, after a defect correction, a noise removal and the like are performed to the read signal by the defect correction/noise remover 114, a luminance signal Y and the color-difference signals C1, C2 are calculated by the YC1C2 extractor 115 in accordance with an equation shown in Equations (1-1). The color-difference signals C1, C2 can be pseudo-color-difference signals Cb, Cr. Hereinafter, the luminance signal Y is abbreviated to "Y" or "signal Y". Similarly, the color-difference signal C1 and the color-difference signal C2 are abbreviated to "C1" or "signal C1" and "C2" or "signal C2", respectively.

$$Y=Mg+Cy+Ye+G$$

$$C1=(Mg+Cy)-(Ye+G)=2B-G$$

$$C2=(Mg+Ye)-(Cy+G)=2R-G \quad \text{(Mathematical Formulae 1-1)}$$

The signal Y are converted by simply adding signals corresponding to the four types of the complementary color filters, the signals C1, C2 are calculated by subtracting two types of signals adjacent in the column direction. It is assumed that, in a primary color signal, a red color signal is R, a green color signal is G, a blue color signal is B, Mg=R+B, Ye=R+G, and Cy=B+G, then C1=2B−G, C2=2R−G, and accordingly C1 and C2 approximately correspond to Cb, Cr in a YCbCr color space respectively.

The data Y, C1, and C2 is calculated for every 2×2 matrix (G, Cy, Ye, Mg) of the color filter array 112. However, since only either of the data C1 and C2 is calculated for every row, the other data is determined by interpolation from each data value of the upper and lower rows.

Next, the above signals Y, C1, C2 are converted into signals R, G, B by the RGB calculator 116 (primary color separation). A conversion equation shown in Equations (1-2) is generally used. This is equivalent to the solution of the simultaneous equations of Equations (1-1) with respect to R, G, and B.

$$R=0.1*Y-0.1*C1+0.4*C2$$

$$G=0.2*Y-0.2*C1-0.2*C2$$

$$B=0.1*Y+0.4*C1-0.1*C2 \quad \text{(Mathematical Formulae 1-2)}$$

In the equations, a characteristic point is that a coefficient of Y has doubled between R and G, and B and G, as described later. The point causes a problem when the mixed signal including the components of the visible light and the infrared light is processed. The white balance unit 117 performs the color correction to the signals R, G, B calculated by the RGB calculator 116. Then, the signals R, G, B are processed by the gamma corrector 118, the YCbCr converter 119, and the chroma corrector 120, and, in the end, output to the outside of the image capturing device 100.

Next, problems caused when the mixed signal including the components of the visible light and the infrared light is processed using the above described conventional image capturing device 100 will be described below.

Figure 3:
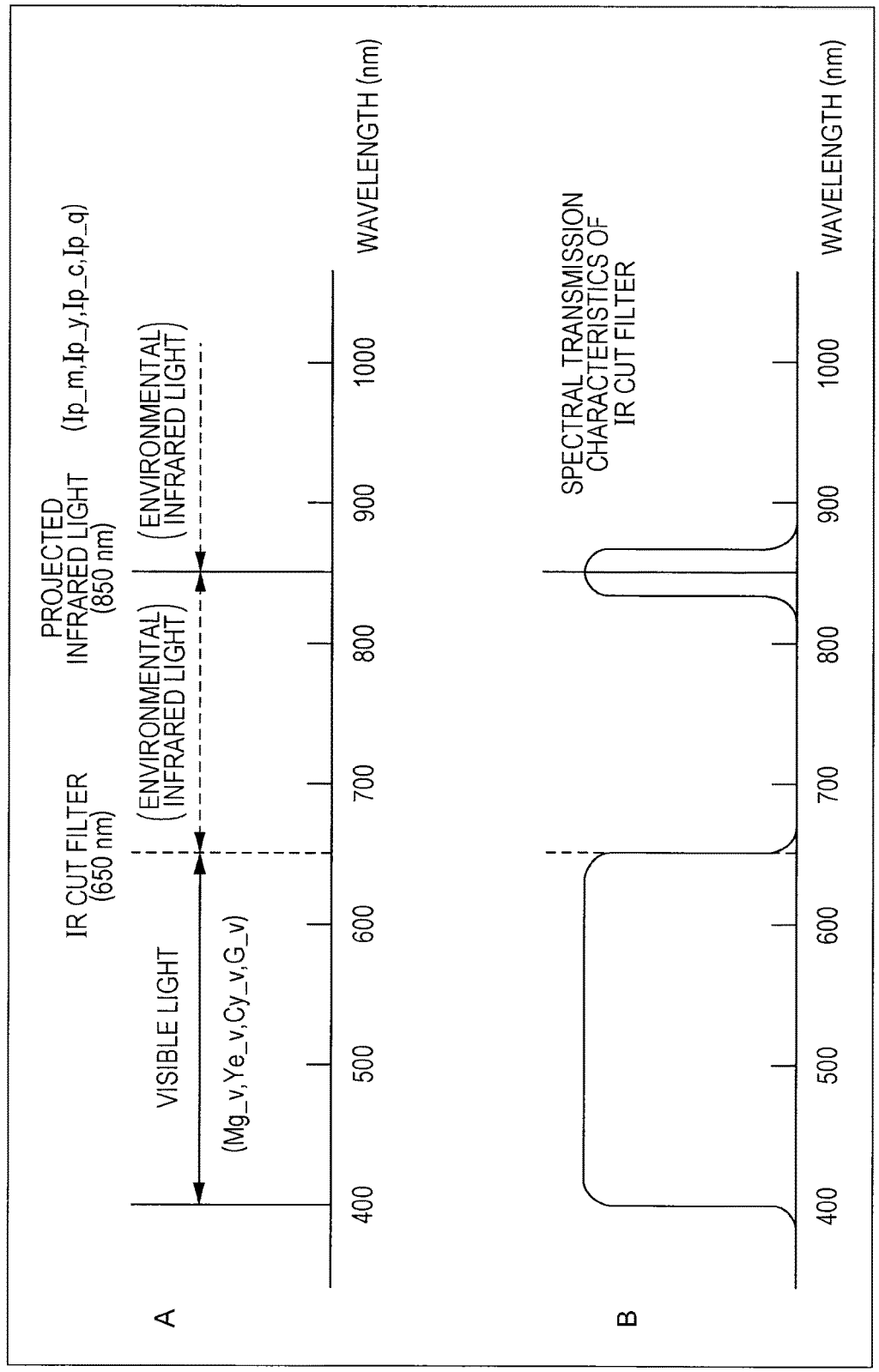
FIGS. 3A and 3B are diagrams to illustrate capturing an image in a night mode.

FIGS. 3A and 3B are diagrams to illustrate capturing an image in the night mode. FIG. 3A shows the wavelength of the light used in capturing the image in night mode. FIG. 3B shows the spectral transmission characteristics of the IR cut filer.

Generally, in a day mode of a surveillance camera and the like, by equipping an infrared cut filter (IR cut filter) having cut frequency in the vicinity of 650 nm, the infrared light component is removed. However, in the night mode, since the IR cut filter is detached, the mixed signal including the components of the visible light and the infrared light is received by the image sensor 113. The infrared light is divided into an afterglow component existing in environment (environmental infrared light) and the projected infrared light component emitted from the camera system (FIG. 3A).

Now, to simplify the following description, it is assumed that the infrared component existing in environment is zero and two types of the visible light component and the projected infrared light component are received by the image sensor 113. This is generally implemented by using the IR cut filter having a band which transmits the light having the surrounding wavelengths of the projected infrared light as shown in FIG. 3B. Furthermore, it is assumed that the signal intensity values of the visible light of 650 nm or less through the complementary color filters (Mg, Ye, Cy, G) of the color filter array 112 are Mg_v, Ye_v, Cy_v, and G_v, and the signal intensity values of the projected infrared light components through the complementary color filters (Mg, Ye, Cy, G) are Ip_m, Ip_y, Ip_c, and Ip_g. It is also assumed that the projected infrared wavelength is the infrared light of 850 nm, which is generally used.

As described above, the signal components of the pixels of the complementary color filters is represented by Mg=Mg_v+Ip_m, Ye=Ye_v+Ip_y, Cy=Cy_v+Ip_c, and G=G_v+Ip_g. When these signals are processed in the procedure shown in FIG. 1, the above signals are converted, by the YC1C2 extractor 115 using Equations (1-1) to be represented as Equations (1-3).

$$Y=(Mg\_v+Ye\_v+Cy\_v+G\_v)+(Ip\_m+Ip\_y+Ip\_c+Ip\_g)$$

$$C1=(Mg\_v+Cy\_v)-(Ye\_v+G\_v)+(Ip\_m+Ip\_c)-(Ip\_y+Ip\_g)$$

$$C2=(Mg\_v+Ye\_v)-(Cy\_v-G\_v)+(Ip\_m+Ip\_y)-(Ip\_c+Ip\_g) \quad \text{(Mathematical Formulae 1-3)}$$

Figure 4:
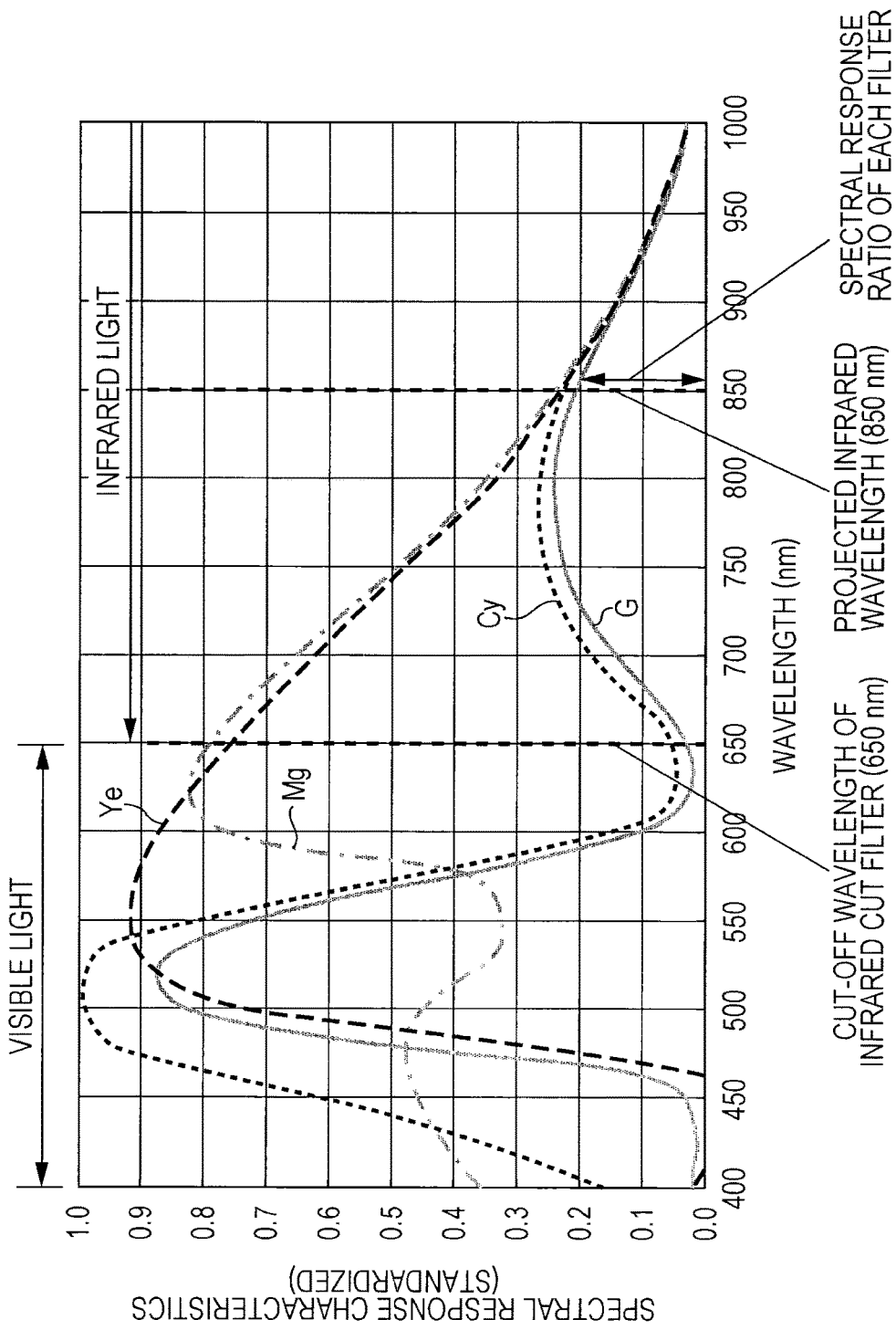
FIG. 4 is a diagram showing an example of spectral response characteristics of the image sensor equipped with the complementary color filter.

FIG. 4 is a diagram showing an example of the spectral response characteristics of the image sensor 113 equipped with the complementary color filter. The horizontal axis represents frequency of incident light and the vertical axis represents standardized spectral response.

When attention is focused on the spectral response characteristics in a projected infrared wavelength of 850 nm, since the sensitivity ratio of the complementary color filters directly corresponds to the signal intensity ratio of Ip_m, Ip_c, Ip_y, and Ip_g, by the spectral response characteristics, it is thus represented as approximately Ip_m=1.02*Ip_y=1.18*Ip_c=1.20*Ip_g=Ip. By using this, Y, C1, C2 in Equations (1-3) are calculated as follows.

$$Y=(Mg\_v+Ye\_v+Cy\_v+G\_v)+3.66*Ip=Y\_v+3.66*Ip$$

$$C1=(Mg\_v+Cy\_v)-(Ye\_v+G\_v)+0.04*Ip=C1\_v+0.04*Ip$$

$$C2=(Mg\_v+Ye\_v)-(Cy\_v+G\_v)+0.3*Ip=C2\_v+0.3*Ip$$

Here, Y_v, C1_v, and C2_v represent the components of the visible light in Y, C1, and C2, respectively.

With the above equations, the projected infrared light component (Ip) is mainly superimposed on the Y component, as well as unequally distributed to the color signals C1, C2.

Next, when the above signals Y, C1, C2 are processed with Equations (1-2) by the RGB calculator 116, the signals are converted as follows:

$R=Rv+0.482*Ip$ $G=Gv+0.664*Ip$ $B=Bv+0.352*Ip$

Here, Rv, Gv, and Bv are the components of only the visible light.

$Rv=0.4*(C2\_v)+0.1*(Y\_v-C1\_v)$ $Gv=0.2*(Y\_v-C1\_v-C2v)$ $Bv=0.4*(C1\_v)+0.1*(Y\_v-C2\_v)$

As described above, the coefficient of the projected infrared light component (Ip) differs in R, G, and B, and in the end, is unequally distributed to R, G, and B. In the above calculation result, about 1.4 times and about 1.9 times, with respect to R and B, respectively, of intensity values of the infrared light components are distributed to G.

Then, the white balance unit 117 performs the white balance process to the signals R, G, B calculated by the RGB calculator 116. When the infrared light signal and the visible light signal are mixed in the signal to be processed, a simple correction is generally performed to correspond to a gray world (R=G=B) (for example, see Patent Literature 2). For example, if the pixel signal is only the infrared light component, the signal intensity ratio of R, G, and B in the all pixels are the same and a full screen is grayed. On the other hand, if the pixel signal is only the color signal, it is possible to perform a color reproduction similar to a normal color process.

However, the optimal gain values of R, G, and B when the pixel signal is only the infrared light signal are different from those when the pixel signal is only the color signal. Accordingly, when the pixel signal is the mixed signal including the components of the infrared light and the visible light, the gain value to simultaneously optimize both of them cannot be obtained. Consequently, according to the intensity ratio of the infrared signal and the visible light signal, the gain values of R, G, B are set to about the intermediate values of the convergence values (optimal values) which are calculated when the white balance processes are independently performed to each of them.

For example, it is assumed that the white balance gain values optimized to the visible light are R=0.8, G=1.0, and B=1.2. On the other hand, the optimal values of the white balance with respect to the projected infrared light are R=1.4, G=1.0, B=1.9, based on the ratio of the coefficient of the infrared light signal by the equations (Equations 1-2) to calculate RGB. Then, the final correction values (gain values) are calculated with respect to these mixed signals, if the luminance values of the infrared light and the visible light are substantially equivalent, the white balance gain values converge to approximately the intermediate values R=1.1, G=1.0, B=1.55. Therefore, the signals R, B are set to the values shifted by 38% ((1.4-1.1)/0.8), 29% ((1.9-1.55)/1.2), respectively, from the optimal gain values of the visible light.

In this situation, the infrared signal component to be originally grayed is colorized, whereas the shifted color reproduction with respect to the original color is performed to the visible light signal. In the end, the entire image is colorized in a final image, the hue of the image is shifted in the object, and these are the factors for deteriorating an image quality.

2. First Embodiment

A first embodiment of the present disclosure can solve the above problems caused when the conventional signal process is performed to the mixed signal including the components of the infrared light and the visible light with respect to an image captured by the image capturing device using an image sensor equipped with a complementary color filter. Hereinafter, an example of a signal processing device, to execute a color reproduction technique according to the first embodiment, applied to the image capturing device, such as a surveillance camera or a civilian camcorder will be described.

[Exemplary Configuration of an Image Capturing Device]

Figure 5:
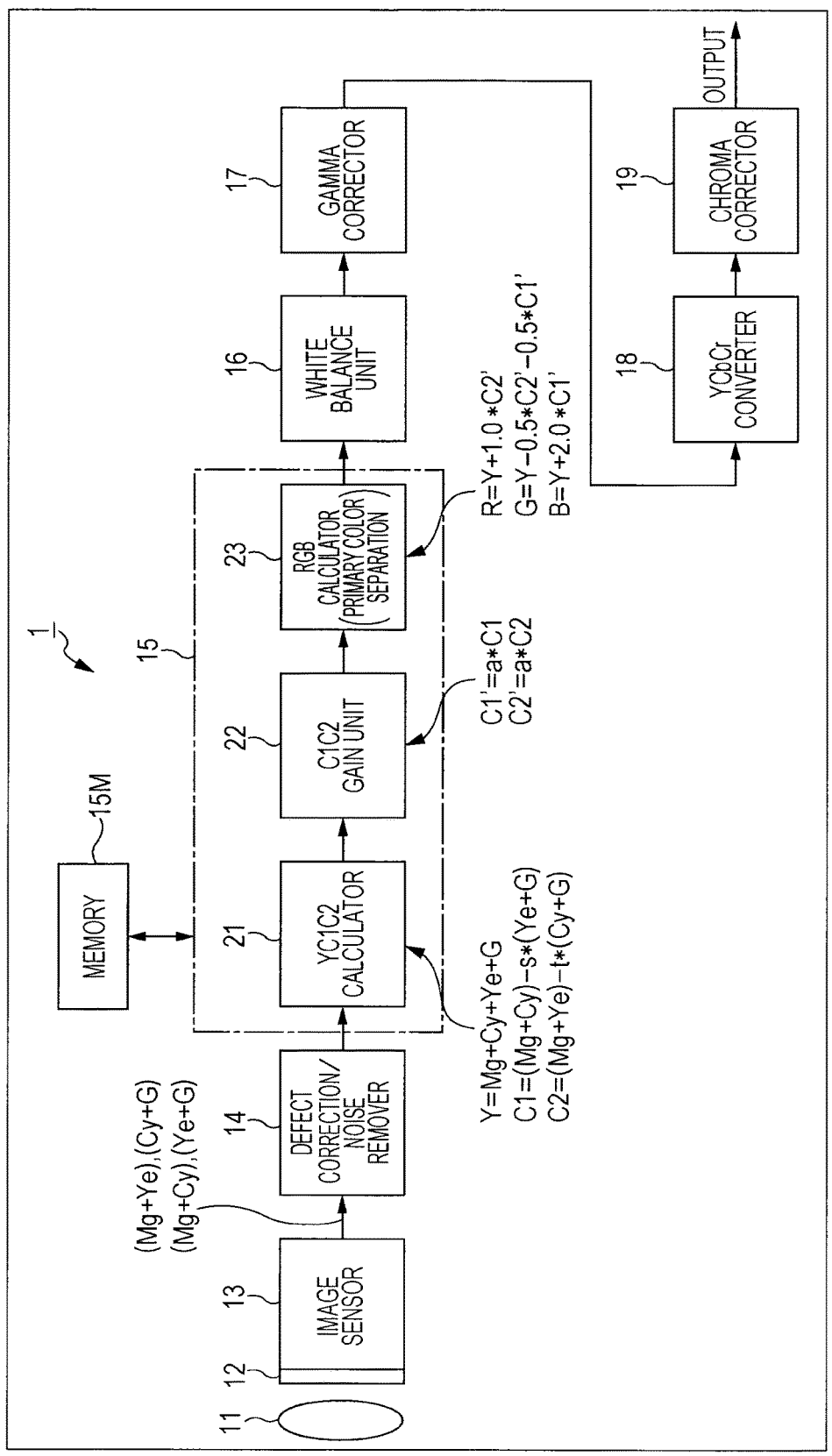
FIG. 5 is a block diagram showing an exemplary configuration of the image capturing device according to a first embodiment of the present disclosure.

FIG. 5 is a block diagram showing an exemplary configuration of the image capturing device according to the first embodiment of the present disclosure.

An image capturing device 1 shown in FIG. 5 is a general camera system, such as a surveillance camera or a digital video camera, using an image sensor 13 on the front surface of which a color-compensate-type color filter array 12 is disposed.

The image capturing device 1 includes an optical lens 11, the image sensor 13 on the front surface of which the color filter array 12 is disposed, a defect correction/noise remover 14, a signal processor 15, and a memory 15M. The image capturing device 1 further includes a white balance unit 16, a gamma corrector 17, a YCbCr converter 18, and a chroma corrector 19.

The image sensor 13 is a photoelectric conversion circuit to convert the light (of the visible light and the projected infrared light) received from the optical lens 11 into an electrical signal. An imaging element using a CCD, a CMOS and the like is generally used. On the front surface of the image sensor 13, the color filter array 12 is provided. The color filter array 12 includes the complementary color filters of four-colors, for example, yellow (Ye), cyan (Cy), magenta (Mg), and green (G), which are arranged in matrix corresponding to the photoelectric conversion elements of the pixels in the image sensor 13 (see FIG. 2). The image sensor 13 photoelectrically converts each color component light which has passed through the complementary color filter of the color filter array 12, using the photoelectric conversion element of the corresponding pixel, and outputs the converted signal as the pixel signal.

In the image sensor 13, a plurality of photoelectric conversion elements corresponding to the pixels are two-dimensionally arranged, and the photoelectric conversion element of each pixel photoelectrically converts each color component light which has passed through the complementary color filters, and outputs the converted signal as the pixel signal (analog signal). The arranged position of each of the complementary color filters which are included in the color filter array 12 corresponds to the arranged position of the pixel of the image sensor 13. In other words, in each pixel, the pixel signal having any one of the colors of Ye, Cy, Mg, and G is created.

The image sensor 13 reads the signal at a frame rate of, for example, 60 fps (field/second) as a specification of the NTSC system. The pixel signal (image signal) output from the image sensor 13 is converted by an A/D converter (not shown) from the analog signal into a digital signal, and is output to the defect correction/noise remover 14.

The defect correction/noise remover 14 corrects a defect and noise of the pixel signal (image signal) due to the image sensor 13 or an optical system.

The signal processor 15 calculates the luminance signal Y and the color-difference signals C1, C2 from a plurality of pixel signals output from the image sensor 13 by the color-difference sequential system, multiplies the color-difference signals C1, C2 by the gain, and calculates the primary color signals R, G, B. The signal processor 15 includes a YC1C2 calculator 21, a C1C2 gain unit 22, and an RGB calculator 23.

The YC1C2 calculator 21 is an example of the color-difference signal calculator. The YC1C2 calculator 21 acquires a plurality of pixel signals corresponding to each color output from the image sensor 13 by the color-difference sequential system. In the equation to calculate the color-difference signal from the pixel signals, the YC1C2 calculator 21 acquires, from the memory 15M, a parameter to eliminate a term corresponding to the predetermined infrared wavelength with respect to the pixel signals. Then, by using the equation to which the parameter is applied, an addition process of the pixel signals is performed and the luminance signal Y is calculated. Furthermore, a subtraction process between the pixel signals is performed and the color-difference signals C1, C2 are calculated.

The above parameter is set, for example, as follows. First, each of signal intensity values of the pixel signals, which correspond to respective colors and are output from the image sensor 13, is standardized so that the signal intensity ratio of the pixel signals in the predetermined infrared wavelength is equated to the sensitivity ratio of the complementary color filters in the predetermined infrared wavelength. Then, in the above equation, the value to eliminate the term corresponding to the predetermined infrared wavelength is set based on each of the standardized signal intensity. The method for setting the parameter will be described later.

The C1C2 gain unit 22 is an example of the color-difference signal amplifier. The C1C2 gain unit 22 amplifies the color-difference signals C1, C2 calculated by the YC1C2 calculator 21 at the predetermined amplification degree.

The RGB calculator 23 is an example of the primary color signal calculator. The RGB calculator 23 calculates the primary color signal R, G, B (image signal) from the luminance signal Y and the color-difference signals C1, C2 (primary color separation). In this process, the coefficient of the luminance signal Y which is included in each primary color signal is fixed and the primary color signal is calculated. Then, the RGB calculator 23 outputs the calculated each primary color signal to the white balance unit 16.

The white balance unit 16 performs a white balance adjustment process to each primary color signal output from the RGB calculator 23 of the signal processor 15 so that the signal level of each color of RGB with respect to a white objet becomes the same. For example, the signals obtained from the all pixels are integrated and the correction is performed to become R=G=B.

The gamma corrector 17 corrects the image signal value of each color output from the white balance unit 16 along a gamma curve.

The YCbCr converter 18 performs the matrix process to the image signal of each color, converts the signal into the signal Y and the color-difference signals Cb, Cr, and separates the signal into the luminance component and the chroma component.

The chroma corrector 19 performs the hue correction (chroma correction) to the chroma components (Cb, Cr) output from the YCbCr converter 18 by multiplying the predetermined chroma gain. Then, the chroma corrector 19 outputs the signal Y and the chroma-corrected color-difference signals Cb, Cb to the subsequent stage.

The memory 15M is a non-volatile storage means. The memory 15M stores, for example, the parameter to eliminate the term corresponding to the predetermined infrared wavelength in the equation to calculate the color-difference signal from the pixel signals output from the image sensor 13.

[Functions of the Signal Processor]

(YC1C2 Calculator 21)

Hereinafter, the functions of each block which are included in the signal processor 15 will be described in detail.

First, in the YC1C2 calculator 21, as the equations to calculate the signals Y, C1, C2, Equations (2-1) are used. The difference from the conventional Equations (1-1) is to set each of the parameters s, t as the coefficient of the second term. Here, each of the parameters s, t is determined so that the signal component of the projected infrared light having the wavelength of 850, nm as shown in Equations (2-2), becomes zero with respect to the color-difference signals C1, C2.

$$Y = Mg + Cy + Ye + G$$

$$C1 = (Mg + Cy) - s*(Ye + G)$$

$$C2 = (Mg + Ye) - t*(Cy + G) \quad \text{(Mathematical Formulae 2-1)}$$

$$C1 = (Mg\_v + Cy\_v) - s*(Ye\_v + G\_v) + (Ip\_m + Ip\_c) - s*(Ip\_y + Ip\_g)$$

$$C2 = (Mg\_v + Ye\_v) - t*(Cy\_v + G\_v) + (Ip\_m + Ip\_y) - t*(Ip\_c + Ip\_g) \quad \text{(Mathematical Formulae 2-2)}$$

Here, in Equations (2-2), so that the third term and after as the projected infrared light component become zero, s and t are set as follows:

$$s = (Ip\_m + Ip\_c)/(Ip\_y + Ip\_g)$$

$$t = (Ip\_m + Ip\_y)/(Ip\_c + Ip\_g)$$

As described above, since the signal intensity ratio, Ip_m, Ip_y, Ip_c, and Ip_g of the projected infrared light components corresponds to the spectral response characteristics ratio of the complementary color filters of 850 nm, in the end, the parameters s, t can be more uniquely determined than spectral response characteristics. For example, the spectral response characteristics of FIG. 4 show, Ip_m=1.02*Ip_y=1.18*Ip_c=1.20*Ip_g=Ip, and approximately s=1.05, t=1.2. As described above, by setting the parameters s, t, the color-difference signals C1, C2 can be represented as the following Equations (2-3).

$$C1 = (Mg\_v + Cy\_v) - s*(Ye\_v + G\_v)$$

$$C2 = (Mg\_v + Ye\_v) - t*(Cy\_v + G\_v) \quad \text{(Mathematical Formulae 2-3)}$$

As shown in Equations (2-3), the infrared light component can be removed from the color-difference signals C1, C2. Here, the visible light components of the C1, C2 are shifted from the original values due to the parameters s, t, but a color adjustment is performed to these values by the RGB calculator 23 at the subsequent stage.

As a method for calculating the actual parameters s, t, the signal intensity ratio, Ip_m, Ip_y, Ip_c, and Ip_g of the projected infrared light components is read from the spectral response characteristics of the image sensor 13 equipped with the color filter array 12, thereby calculating the parameter. As a method for further improving the accuracy, the image capturing device 1 (image sensor 13) acquires the image captured with the light source of only the projected infrared light, calculates the average value of Y, C1, C2 of the entire image, and sets the parameters s, t so that C1 and C2 become zero. This process needs to be performed once, as a calibration of the image capturing device (camera system), by one of the image capturing devices equipped with the same image sensor 13, or by each individual image capturing device.

Furthermore, setting the above parameters s, t may be executed by the YC1C2 calculator 21, or may be performed in advance by an arithmetic processing device (not shown), such as a microcomputer which controls the entire block in the image capturing device 1. The set data of parameters s, t is stored in the memory 15M and appropriately read by the YC1C2 calculator 21. The data of parameters s, t may be stored in the YC1C2 calculator 21.

(The C1C2 Gain Unit 22)

Next, in the C1C2 gain unit 22 at the subsequent stage of the YC1C2 calculator 21, the color-difference signals C1, C2 are multiplied by the gain coefficient a (a>0) (Equations 2-4), and the signals are amplified (C1', C2').

$$C1'=a*C1$$

$$C2'=a*C2 \quad \text{(Mathematical Formulae 2-4)}$$

(RGB Calculator 23)

Next, the RGB calculator 23 calculates the signals R, G, B. Here, an example of the equation to calculate RGB is shown in Equations (2-5). In the equation, unlike Equations (1-2), the coefficients of Y are set to become the same. In the example, the coefficient of Y is 1, but may be any one of the other values. Furthermore, the coefficient of Y may be stored in the memory 15M and may be appropriately read by the RGB calculator 23.

$$R=Rv+3.66*Ip$$

$$G=Gv+3.66*Ip$$

$$B=Bv+3.66*Ip \quad \text{(Mathematical Formulae 2-5)}$$

Here, Rv, Gv, Bv is as follows.

$$Rv=Y\_v+1.0*C2'\_v$$

$$Gv=Y\_v-0.5*C2'\_v-0.5*C1'\_v$$

$$Bv=Y\_v+2.0*C2'\_v$$

However, C1'_v and C2'_v are the visible light components of C1' and C2', respectively.

In other words, when Equations (2-5) are compared with and the conventional Equations (1-2), the component of the infrared light in the present embodiment is equally distributed to R, G and B. Thereafter, similar to the conventional example, the color correction is performed by the white balance unit 16. Then, the processes are performed by the gamma corrector 17, the YCbCr converter 18, the chroma corrector 19, and the like. In the end, the signal is output to the outside of the image capturing device 1. Furthermore, the image signal to which the above described processes have been performed may be stored in the memory 15M or a storage device with large capacity (not shown).

The first embodiment is summarized into the following paragraphs (1) to (3).

(1) The YC1C2 calculator 21 removes the infrared light component from the signals C1, C2 by setting the parameters s, t.

(2) The C1C2 gain unit 22 performs the intensity adjustment of the visible light and the infrared light by adjusting gain of the signals C1, C2 from which the infrared light component has been removed.

(3) The RGB calculator 23 equally distributes the infrared light component to the signals R, G, B by unifying the coefficients of the signal Y.

With these processes in (1), (2), and (3), it is possible to improve the color reproduction accuracy and the robustness under the various environments with respect to the image captured by the image capturing device using the image sensor equipped with the complementary color filter.

In the above (1), in the equation to calculate the signals C1, C2 from the pixel signals, the parameter to eliminate the term corresponding to the predetermined infrared wavelength is set and the signals C1, C2 are calculated using the equation. Therefore, since the signal component by the target infrared light can be excluded from the signals C1, C2, it is possible to improve color saturation and hue reproduction accuracy.

The process described in the above (2) is advantageous when the white balance process is performed at the subsequent stage of the signal processor 15. Although a balance point of the white balance is weighted based on the intensity ratio of the infrared light and the visible light, the intensity ratio can be adjusted by changing the gain of the signals C1, C2 from which the infrared light component has been removed. Usually, in capturing an image in the night mode, it is assumed that the visible light is weak. Accordingly, in the signal component output from the image sensor 13, the infrared light component is dominant, and it is likely to converge on the optimal balance point for the infrared light component. However, by multiplying the visible light components (C1, C2) by gain, it is possible to get them closer to the balance point of the visible light. Furthermore, by removing the infrared light component from the signals C1, C2 in the above process in (1), it is possible to perform the gain process to the visible light component.

In the above (3), by equally distributing the signal Y including the infrared light component to the signals R, G, B, it is possible to avoid a hue shift due to the infrared light component. In other words, by the white balance unit 16 at the subsequent stage, similar to a conventional example, the balance point is set to the intermediate of the optimal gain values of the visible light component and the infrared light component. However, since the infrared light component has been set to the grayish (R=G=B), with respect to each of the gain values when the infrared light is mixed with the visible light, it is possible to reduce the shift from the optimal gain value. For example, in a light source of a conventional example, whereas the optimal gain values of the visible light are R=0.8, G=1.0, and B=1.2, the optimal gain values of the infrared light are R=1.0, G=1.0, and B=1.0. Therefore, if the intensity values of both of the light are substantially equal, the final gain values are R=0.9, G=1.0, and B=1.1, and the shift of the infrared light and the visible light from the target optimal value is approximately 10%.

With the above sequence of operations, with respect to the mixed signal including the components of the visible light and the infrared light, without optimizing the white balance biased to either of the signals, it is possible to converge on the balance point compromising both of the signals. Therefore, it is possible to improve the robustness against various lighting conditions (visible light) having biased emission spectrum.

The above processes in (1), (2), and (3) are not necessary to be performed in sequence. For example, only the process in (1) may be performed, or a combined processes including at least the process in (1) may be performed. In other words, in the process in (1), by removing the infrared light component from the signals C1, C2, it is possible to improve the color reproduction accuracy and the robustness under various environments. For example, the combined processes can be (1), (1)+(2), (1)+(2)+(3), and (1)+(3), it is possible to obtain at least one effect among the effects above described in (1) to (3).

3. Second Embodiment

In a second embodiment, a similar technique to the signal process described in the first embodiment is applied to the image capturing device using the image sensor equipped with the primary color filter.

In the color filter array using the primary color filter, the primary color filters of red (R), green (G), and blue (B) arranged in the Bayer method is generally used. In the Bayer arrangement, for example, a filter G as the first color component is arranged in a checkerboard pattern, as well as filters R and B as the second or third color component are alternately arranged in every row on the positions other than the filter G is arranged.

Figure 6:
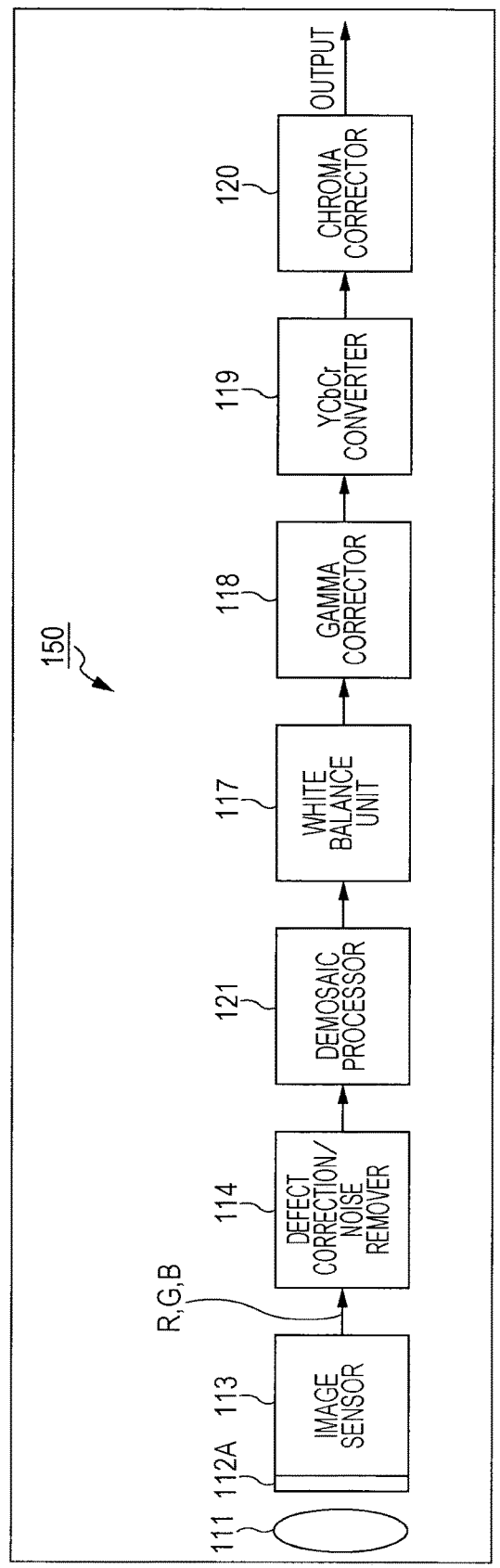
FIG. 6 is a functional block diagram showing an exemplary configuration of the image capturing device using an image sensor equipped with a conventional primary color filter.

FIG. 6 is a functional block diagram showing an exemplary configuration of the image capturing device using the image sensor equipped with a conventional primary color filter.

An image capturing device 150 shown in FIG. 6 includes an optical lens 111, an image sensor 113 on the front surface of which a primary-color-type color filter array 112A is disposed, a defect correction/noise remover 114, and a demosaic processor 121. Furthermore, the image capturing device 150 includes a white balance unit 117, a gamma corrector 118, a YCbCr converter 119, and a chroma corrector 120.

The image sensor 113 photoelectrically converts each color component light (R, G, B) which has passed through the primary color filters of the color filter array 112A, using the photoelectric conversion element of the corresponding pixel and outputs the converted signal as the pixel signal.

The demosaic processor 121 performs, by estimating the color component which is not in the pixel signal, an interpolation process of the estimated color component (demosaic) to the pixel signal of each pixel of the image signal (mosaic image) output from the defect correction/noise remover 114. In each pixel of the image sensor 113, since the data of only a color corresponding to any one of R, G and B can be obtained, the other color data is interpolated by performing an arithmetic operation using the pixel signals of the peripheral pixels.

As described above, in the conventional signal processing, after a defect correction and the like are performed to the signals R, G, B read from the image sensor 113, the signal data of R, G, B is distributed to each pixel by the demosaic process, and then, the white balance is performed. With these processes, since the infrared light component is unequally distributed to R, G, and B similar to the example of the processes of the first embodiment using the complementary color filter, the gain by the white balance process is likely to be shifted from each of the optimal gain values of the visible light and the infrared light.

On the other hand, in the present embodiment, after the demosaic process is performed, the signals R, G, B is converted into the signals Y, C1, C2 similar to the first embodiment, and then, the white balance process is performed.

Figure 7:
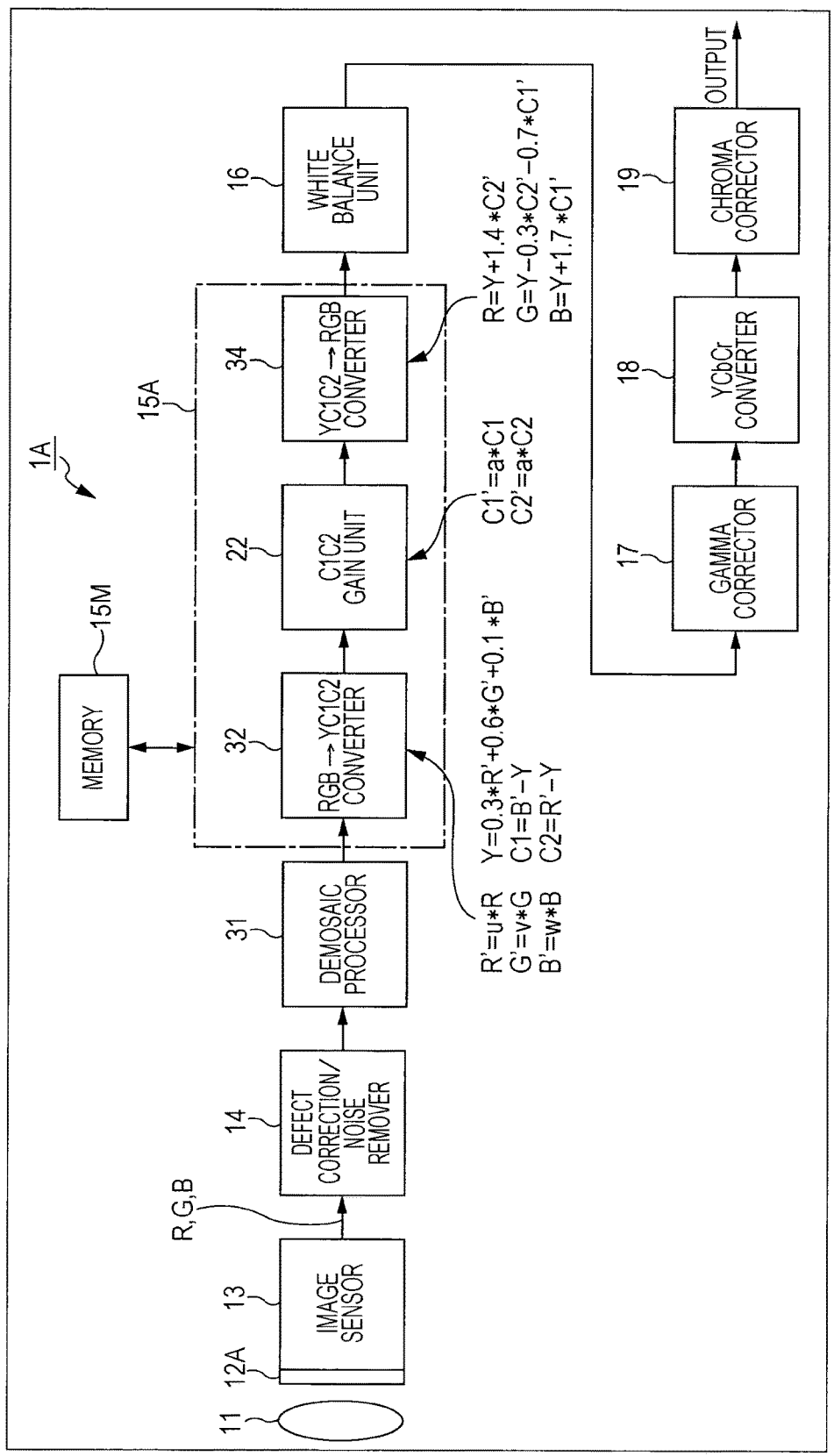
FIG. 7 is a block diagram showing an exemplary configuration of the image capturing device according to a second embodiment of the present disclosure.

FIG. 7 is a block diagram showing an exemplary configuration of the image capturing device according to the second embodiment of the present disclosure.

An image capturing device 1A as shown in FIG. 7 includes an optical lens 11, an image sensor 13 on the front surface of which a color filter array 12A is disposed, a defect correction/noise remover 14, a demosaic processor 31, a signal processor 15A, and a memory 15M. Furthermore, the image capturing device 1 includes a white balance unit 16, a gamma corrector 17, a YCbCr converter 18, and a chroma corrector 19.

The color filter array 12A corresponds to the color filter array 112A, and for example, the primary color filters are arranged in the Bayer. The image sensor 13 photoelectrically converts each color component light (R, G, B) which has passed through the primary color filters of the color filter array 12A, using the photoelectric conversion element of the corresponding pixel, and outputs the converted signal as the pixel signal.

The demosaic processor 31 performs, by estimating the color component which is not in the pixel signal, the interpolation process (demosaic) of the estimated color component to the pixel signal of each pixel of the image signal (mosaic image) output from the defect correction/noise remover 14.

The signal processor 15A converts the pixel signals corresponding to each color (R, G, B) input by the demosaic processor 31 into the luminance signal Y and the color-difference signals C1, C2, multiplies the color-difference signals C1, C2 by gain, and converts the signals into the primary color signals R, G, B. The signal processor 15A includes a YC1C2 converter 32, the C1C2 gain unit 22, and an RGB converter 34.

The YC1C2 converter 32 converts the pixel signals corresponding to each color (R, G, B) input by the demosaic processor 31 into the luminance signal Y and the color-difference signals C1, C2.

The RGB converter 34 converts the color-difference signals C1, C2 multiplied by the gain by the C1C2 gain unit 22 into the primary color signals R, G, B. Then, the RGB converter 34 outputs each of the primary color signals to the white balance unit 16.

[Functions of the Signal Processor]
(YC1C2 Converter 32)

Hereinafter, the functions of each block which is included in the signal processor 15A will be described in detail.

Figure 8:
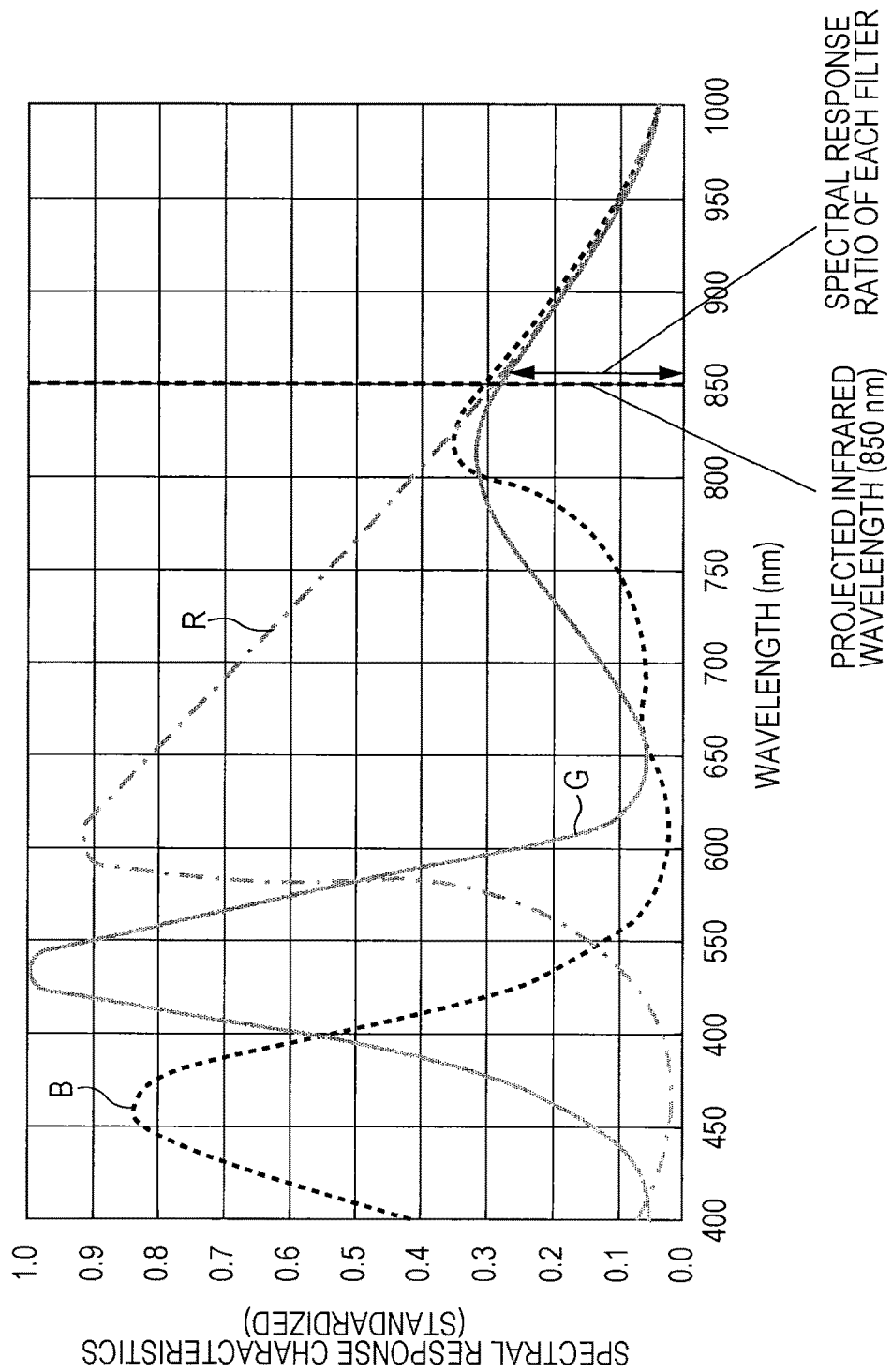
FIG. 8 is a diagram showing an example of spectral response characteristics of the image sensor equipped with a primary color filter.

First, the YC1C2 converter 32 performs standardization (R', G', B') to the signals R, G, B input by the demosaic processor 31, according to the spectral response characteristics of the projected infrared light having the wavelength of 850 nm, as shown in Equations (3-1). FIG. 8 is a diagram showing an example of the spectral response characteristics of the image sensor equipped with the primary color filter.

$$R'=u*R$$

$$G'=v*G$$

$$B'=w*B \qquad \text{(Mathematical Formulae 3-1)}$$

Then, the luminance signal Y and the color-difference signals C1, C2 are calculated with respect to the standardized signals R', G', B' based on Equations (3-2). In Equations (2-2) according to the first embodiment, each term of the equation has been described that the signal intensity values of the visible light are Mg_v, Ye_v, Cy_v, and G_v, and the signal intensity values of the projected infrared light components of the complementary color filters (Mg, Ye, Cy, G) are Ip_m, Ip_y, Ip_c, and Ip_g. The description will not be repeated.

$$Y=0.3*R'+0.6*G'+0.1*B'$$

$$C1=B'-Y$$

$$C2=R'-Y \quad \text{(Mathematical Formulae 3-2)}$$

Here, similar to the parameters s, t in Equations (2-3) of the first embodiment, the parameters u, v, w are set so that the signal component of the projected infrared light having a wavelength of 850 nm becomes zero in the color-difference signals C1, C2 shown in Equations (3-2). The projected infrared light component Ip is thereby concentrated on the signal Y and canceled in the signals C1, C2.

Then, the C1C2 gain unit 22 multiplies the color-difference signals C1, C2 by the gain coefficient a (a>0) (Equations 3-3), the signals are amplified (C1', C2').

$$C1'=a*C1$$

$$C2'=a*C2 \quad \text{(Mathematical Formulae 3-3)}$$

(RGB Converter 34)

Thereafter, the RGB converter 34 converts the color-difference signals C1, C2 into the primary color signals R, G, B. The infrared light component Ip is equally distributed to the signals R, G, B which have been converted, for each of the signals R, G, B (Equations 3-4). In other words, similar to the first embodiment, the coefficients of Y in (Equations 3-4) are set to become the same.

$$R=Y+1.4*C2'$$

$$G=Y-0.3*C2'-0.7*C1'$$

$$B=Y+1.7*C1' \quad \text{(Mathematical Formulae 3-4)}$$

Thereafter, similar to the conventional example, the white balance unit 16 performs the color correction. With the configuration, it is possible to gray (R=G=B) the optimal value of the infrared light component by the white balance.

With the above described second embodiment, similar to the first embodiment, with respect to the mixed signal including the components of the infrared light and the visible light captured and acquired by the image capturing device using the image sensor equipped with the primary color filter, it is possible to improve the color reproduction accuracy and the robustness against various light sources.

The above setting of the parameters u, v, w, may be executed by the YC1C2 converter 32, or may be performed in advance by an arithmetic processing device (not shown), such as a microcomputer in the image capturing device 1.

The set data of the parameters u, v, w is stored in the memory 15M and appropriately read by the YC1C2 converter 32. The data of the parameters u, v, w may be stored in the YC1C2 converter 32.

4. Third Embodiment

A second embodiment is regarding the process at the subsequent stage with respect to color-difference signals C1, C2 calculated in the first and second embodiment.

In the signal process at the subsequent stage in the conventional signal process, the signal is output to the outside through the processes of a gamma coefficient, a linear matrix coefficient, an aperture control, and the like, similar to the normal camera signal process. However, since it is assumed that the original image is captured in low illumination such as a dark environment, the image has much color noise. Therefore, in the similar process of the normal camera signal, the image having much granular color noise can be reproduced. To solve the problem, the embodiment applies a large area noise reduction filter to the color-difference signals C1, C2.

Figure 9:
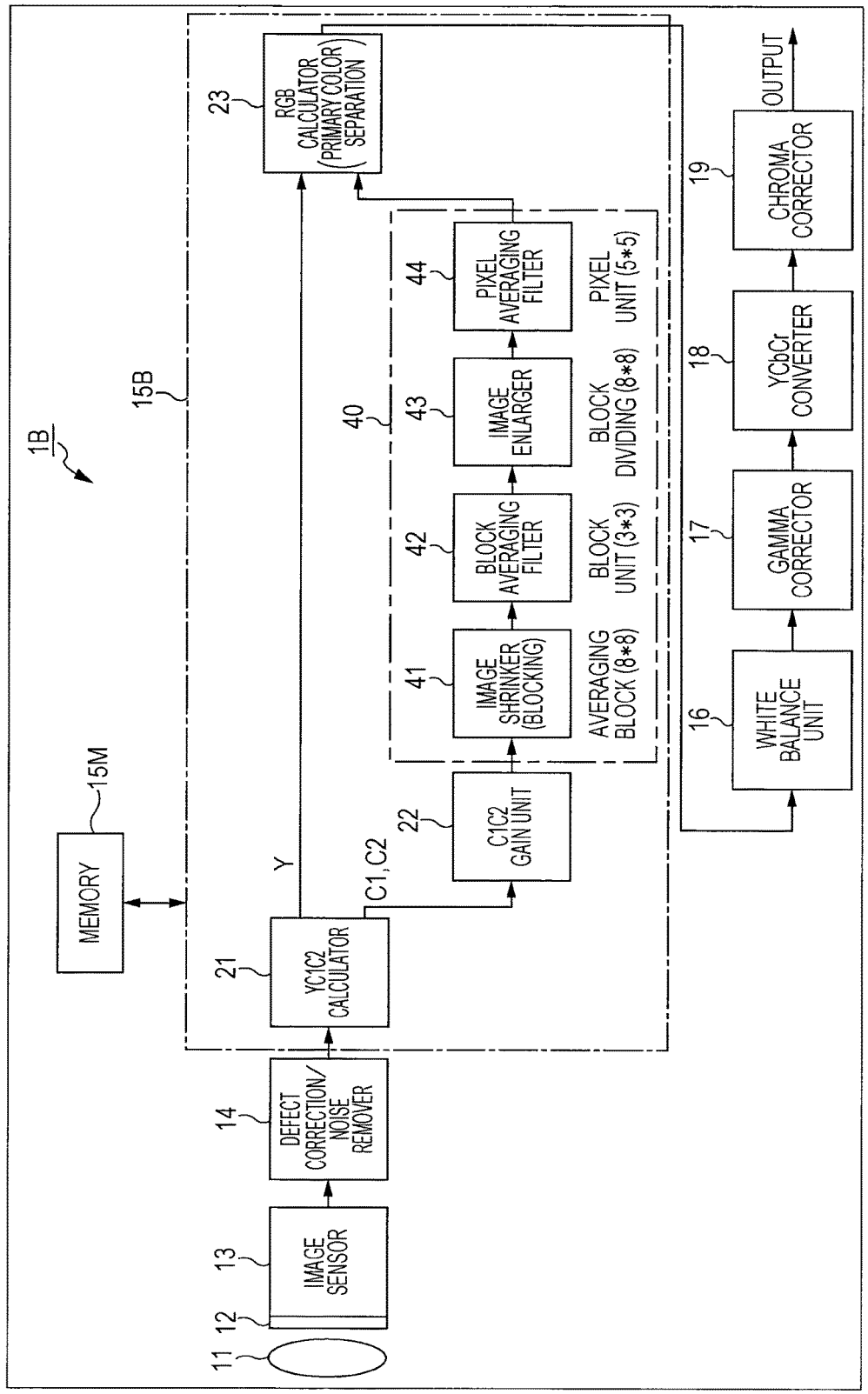
FIG. 9 is a block diagram showing an exemplary configuration of the image capturing device according to a third embodiment of the present disclosure.

FIG. 9 is a block diagram showing an exemplary configuration of the image capturing device according to the third embodiment of the present disclosure.

An image capturing device 1B as shown in FIG. 9 is, similar to the first embodiment, the image capturing device using the image sensor equipped with the complementary color filter.

The image capturing device 1B includes an optical lens 11, an image sensor 13 on the front surface of which a color filter array 12 is disposed, a defect correction/noise remover 14, a signal processor 15B, and a memory 15M. Furthermore, an image capturing device 1 includes a white balance unit 16, a gamma corrector 17, a YCbCr converter 18, and a chroma corrector 19.

The signal processor 15B calculates a luminance signal Y and color-difference signals C1, C2 from the pixel signals output from the image sensor 13 by the color-difference sequential system, performs a noise reduction process to the color-difference signals C1, C2, and calculates the primary color signals R, G, B. The signal processor 15B includes a YC1C2 calculator 21, a C1C2 gain unit 22, an RGB calculator 23, and a noise reducer 40. With regard to reading the signal data from the image sensor 13, calculating Y, C1, and C2, and C1 and C2 gain, the processes are performed similarly to the first embodiment.

The noise reducer 40 performs image shrinkage and image enlargement only to the color-difference signals C1, C2 and in the process, performs a large area noise reduction process. The noise reducer 40 includes an image shrinker 41, a block averaging filter 42, an image enlarger 43, and a pixel averaging filter 44.

The noise reducer 40 creates a shrunk image of, for example, ⅛ size with respect to the color-difference signals C1, C2 input by the C1C2 gain unit 22 in image shrinker 41. In other words, 64 pixels are blocked to one pixel. In creating the shrunk image, the simple average of the block of 8*8 pixels of the original image may be the shrunk pixel value, or the average of the weighted pixel value in the block may be the shrunk pixel value.

Next, the block averaging filter 42 applies the 3*3 averaging filter to each pixel of the shrunk image. With the averaging process, the edge of the shrunk image is not conspicuous.

Thereafter, to return the shrunk image to the original image size, the image enlarger 43 divides the block and enlarges the image. To be converted into the original image size, the pixel value of the shrunk image is simply applied to the pixel value of 8*8 pixels and the image having 8 times the length of a side is created.

However, with the image as it is, the boundary by the 8*8 pixel block is clear. Therefore, the pixel averaging filter 44 further applies the 5*5 pixels averaging filter to the image enlarged by the image enlarger 43 to smoothly change the pixel value at the boundary.

In this manner, the averaged signals C1, C2 are transferred simultaneously with the signal Y to the RGB calculator 23. The subsequent processes are similar to those in the first embodiment.

With the above described signal process of the third embodiment, it is possible to efficiently average the color noise distributed in large area of the image and create the image having little color noise. The large area noise filter generally impairs a detail reproduction of the image. However, in the present embodiment, since the noise reduction process is performed only to the color-difference signals C1, C2, the resolution of the final image is not impaired. Furthermore, by using the shrunk image as a large area noise filter, it is possible to reduce a line buffer when the signal process is incorporated into hardware.

5. Fourth Embodiment

In the above described first to third embodiments, the case where the projected infrared light component only exists as the infrared light and the infrared light by environments does not exist has been described. Conversely, the processes are applicable when the projected infrared light does not exist and only the environmental infrared light exists.

In the process in (1) of the first embodiment, the infrared light component cannot be completely eliminated from the signals C1, C2. However, with the method of the calibration described in the first embodiment, by calculating the parameters s, t so that the target infrared light component is closer to 0 (zero) in the signals C1, C2, it is possible to exclude the influence of the target infrared light. As the calibration technique, by equipping the image capturing device with the filter which cuts-off the visible light and transmits only the infrared light, only the infrared light from the environmental light is received. Then, the infrared light wavelength having strong signal intensity is specified and the influence of the infrared light is excluded.

The technique is applicable, in the night mode at nighttime, when the sensitivity is increased by receiving the environmental infrared light without projecting the infrared light. On the other hand, in capturing an image in the day mode at daytime, the technique is applicable as a method for improving the color reproduction when an image is captured by the image capturing device without an IR cut filter. When the IR cut filter shown in FIG. 3B is used, the environmental infrared light of approximately 850 nm is transmitted through the filter in capturing an image at daytime. However, by applying the embodiments, it is possible to exclude the influence of the infrared light of approximately 850 nm.

Furthermore, the present disclosure may have the configurations as follows.

(1)

A signal processing device including:

a color-difference signal calculator configured to calculate a luminance signal obtained by performing an addition process of a plurality of pixel signals and a color-difference signal obtained by performing a subtraction process between the plurality of pixel signals, the calculation being made with respect to the plurality of pixel signals output by a color-difference sequential system from an image sensor on which light, which has passed through a color filter array including a plurality of complementary color filters, is incident, using an equation to which a parameter, to erase a term corresponding to a predetermined infrared wavelength in a equation to calculate a color-difference signal from the plurality of pixel signals, is applied.

(2)

The signal processing device according to (1), wherein, by standardizing each of signal intensity values of the plurality of pixel signals output from the image sensor such that a signal intensity ratio of the plurality of pixel signals in a predetermined infrared wavelength is equated to a sensitivity ratio of the plurality of complementary color filters in the predetermined infrared wavelength, the parameter is set to a value to eliminate a term corresponding to the predetermined infrared wavelength in the equation based on each of the standardized signal intensity values.

(3)

The signal processing device according to (1) or (2), further including a color-difference signal amplifier configured to amplify the color-difference signal calculated by the color-difference signal calculator.

(4)

The signal processing device according to any of (1) to (3), further including a primary color signal calculator configured to calculate primary color signals, i.e. a red signal, a green signal, and a blue signal, from the luminance signal and the color-difference signal, wherein the primary color signal calculator calculates each of the primary color signals with a fixed coefficient of the luminance signal which is include in each of the primary color signals.

(5)

The signal processing device according to any of (2) to (4), wherein a sensitivity ratio of the plurality of complementary color filters in the predetermined infrared wavelength is obtained based on spectral response characteristics of the image sensor.

(6)

The signal processing device according to any of (2) to (4), wherein, from an image captured by the image sensor using a light source of the predetermined infrared wavelength, an average value of the color-difference signal of the entire image is calculated, and the parameter is set such that the average value of the color-difference signal becomes zero.

(7)

The signal processing device according to any of (1) to (6), wherein the infrared wavelength is a wavelength of projected infrared light.

(8)

A signal processing device including:

a color-difference signal converter configured to convert a plurality of pixel signals into a luminance signal obtained by performing an addition process of the plurality of pixel signals and a color-difference signal obtained by performing a subtraction process between the plurality of pixel signals, the conversion being made with respect to the plurality of pixel signals output from an image sensor on which light, which has passed through a color filter array including a plurality of primary color filters, is incident, using an equation to which a parameter, to eliminate a term corresponding to a predetermined infrared wavelength in a equation to calculate a color-difference signal from the plurality of pixel signals, is applied.

(9)

A signal processing method including:

acquiring a plurality of pixel signals output by a color-difference sequential system from an image sensor on which light, having passed through a color filter array including a plurality of complementary color filters, is incident;

setting a parameter to eliminate a term corresponding to a predetermined infrared wavelength in an equation to calculate a color-difference signal from the plurality of pixel signals with respect to the plurality of pixel signals; and calculating, thereafter, a luminance signal obtained by performing an addition process of the plurality of pixel signals and a color-difference signal obtained by performing a subtraction process between the plurality of pixel signals, using the equation to which the parameter is applied.

(10)

A signal processing method including:

acquiring a plurality of pixel signals output from an image sensor on which light, having passed through a color filter array including a plurality of primary color filters, is incident;

setting a parameter to eliminate a term corresponding to a predetermined infrared wavelength in an equation to calculate a color-difference signal from the plurality of pixel signals with respect to the plurality of pixel signals; and converting, thereafter, the plurality of pixel signals to a luminance signal obtained by performing an addition process of the plurality of pixel signals and a color-difference signal obtained by performing a subtraction process between the plurality of pixel signals, using the equation to which the parameter is applied.

(11)

A signal processing program for causing a computer to execute:

a process of acquiring a plurality of pixel signals output by a color-difference sequential system from an image sensor on which light, having passed through a color filter array including a plurality of complementary color filters, is incident;

a process of setting a parameter to eliminate a term corresponding to a predetermined infrared wavelength in an equation to calculate a color-difference signal from the plurality of pixel signals with respect to the plurality of pixel signals; and a process of calculating, thereafter, a luminance signal obtained by performing an addition process of the plurality of pixel signals and a color-difference signal obtained by performing a subtraction process between the plurality of pixel signals, using the equation to which the parameter is applied.

(12)

A signal processing program for causing a computer to execute:

a process of acquiring a plurality of pixel signals output from an image sensor on which light, having passed through a color filter array including a plurality of primary color filters, is incident;

process of setting a parameter to eliminate a term corresponding to a predetermined infrared wavelength in an equation to calculate a color-difference signal from the plurality of pixel signals, with respect to the plurality of pixel signals; and a process of converting, thereafter, the plurality of pixel signals to a luminance signal obtained by performing an addition process of the plurality of pixel signals and a color-difference signal obtained by performing a subtraction process between the plurality of pixel signals, using the equation to which the parameter is applied.

As described above, the image capturing device according to the above described embodiments performs the image process of extracting the general configuration of the image. The information extracted by the image process can be applicable to a process for improving an image quality, and also applicable to not only a digital camera but also the other devices as a device equipped with a block which extracts the general configuration of an image. Such devices include an image capturing device, e.g., a digital still camera, and a display device, e.g., a printer and a display. Furthermore, the information is also applicable to a device or a computer program which processes or edits an image.

[Exemplary Configuration of Hardware of a Computer]

The above described series of processes in the embodiments can be executed by not only hardware but also software. When the series of processes are executed by software, a computer in which a program consisting the software is incorporated into a dedicated hardware or a computer to which a program to execute various functions is installed is used to execute the processes. For example, the processes may be executed by a general-purpose personal computer to which the program consisting the desired software is installed.

FIG. 10 is a block diagram showing an exemplary configuration of hardware of a computer executing the above series of processes by a program.

In the computer, a CPU 201, a read only memory (ROM) 202, and a RAM 203 are connected to each other by a bus 204.

The bus 204 is connected to an input/output interface 205. The input/output interface 205 is connected to an input unit 206 (e.g., a key board, a mouse, and a microphone), an output unit 207 (e.g., a display and a speaker), a storage unit 208 (e.g., a hard disk and a non-volatile memory), a communication unit 209 (e.g., a network interface), and a drive 210 which drives a removable medium 211 (e.g., a magnetic disk, an optical disk, a magneto-optical disk, or a semiconductor memory).

In the computer having the above configuration, the series of processes are performed by loading the program recorded, for example, in the storage unit 208 to the RAM 203 through the input/output interface 205 and the bus 204 and executing the program by the CPU 201. [0130]

The program executed by the computer (CPU 201) is provided by being stored in the removable medium 211 as a package medium, such as a magnetic disk (including a flexible disk), an optical disk (e.g., a compact disc-read only memory (CD-ROM), a digital versatile disc (DVD)), an magneto-optical disk, or a semiconductor memory, or is provided thorough a wired/radio transmission medium, such as a local area network, an internet, or a digital satellite broadcast.

The program can be installed to the storage unit 208 through the input/output interface 205 by mounting the removable medium 211 to the drive 210. The program can be installed to the storage unit 208 by receiving the program thorough a wired/radio transmission medium by the communication unit 209. Furthermore, the program can be installed to the ROM 202 and the storage unit 208 in advance.

The program executed by the computer may be performed in chronological order described herein or may also be performed in parallel or at a necessary timing, for example, when a call is executed.

The present disclosure is not limited to the above described embodiments, and various modifications and application examples can be made without departing from the scope and spirit of the disclosure.

In other words, since the above described examples of the embodiments are the preferable specific examples of the present disclosure, various technically preferable limitations are given. However, the technical scope of the present disclosure is not limited to these embodiments unless the limitation of the present disclosure is particularly stated in each description. For example, the used materials and the amount thereof, the processing time, the processing order, and the numerical conditions of each parameter, which are mentioned in the above descriptions, are merely preferred examples. Furthermore, in each of the drawings used for the description, the dimensions, the shapes and the arrangement relations merely represent outlines.

REFERENCE SIGNS LIST 1, 1A, 1B Image capturing device
12 Color filter array (complementary color filter)
12A Color filter array (primary color filter)
13 Image sensor
15, 15A, 15B Signal processor
15M Memory
16 White balance unit
21 YC1C2 calculator (color-difference signal calculator)
22 C1C2 gain unit (color-difference signal amplifier)
23 RGB calculator (primary color signal calculator)
32 YC1C2 converter (color-difference signal converter)
33 C1C2 gain unit (color-difference signal amplifier)
34 RGB converter
40 Noise reducer
41 Image shrinker
42 Block averaging filter
43 Image enlarger
44 Pixel averaging filter

The invention claimed is:

1. A signal processing device comprising:
  circuitry configured to
    receive a plurality of pixel signals output from an image sensor on which light, which has passed through a color filter array including a plurality of complementary color filters, is incident,
    calculate a luminance signal obtained by performing an addition process of the plurality of pixel signals, and
    calculate a color-difference signal obtained by performing a subtraction process between the plurality of pixel signals, wherein
    the color-difference signal is calculated using an equation to which a parameter to remove an infrared light component of a predetermined infrared wavelength is applied, and
    by standardizing each of signal intensity values of the plurality of pixel signals output from the image sensor such that a signal intensity ratio of the plurality of pixel signals in the predetermined infrared wavelength is equated to a sensitivity ratio of the plurality of complementary color filters in the predetermined infrared wavelength, the parameter is set to a value to remove the infrared light component of the predetermined infrared wavelength in the equation based on each of the standardized signal intensity values.

2. The signal processing device according to claim 1, wherein the circuitry is configured to
  amplify the calculated color-difference signal.

3. The signal processing device according to claim 2, wherein the circuitry is configured to
  calculate primary color signals from the luminance signal and the color-difference signal, the primary color signals including a red signal, a green signal, and a blue signal, and
  calculate each of the primary color signals with a fixed coefficient of the luminance signal which is included in each of the primary color signals.

4. The signal processing device according to claim 1, wherein the sensitivity ratio of the plurality of complementary color filters in the predetermined infrared wavelength is obtained based on spectral response characteristics of the image sensor.

5. The signal processing device according to claim 1, wherein, from an image captured by the image sensor using a light source of the predetermined infrared wavelength, an average value of the color-difference signal of the entire image is calculated, and the parameter is set such that the average value of the color-difference signal becomes zero.

6. The signal processing device according to claim 1, wherein the predetermined infrared wavelength is a wavelength of projected infrared light.

7. The signal processing device according to claim 1, wherein the equation to which the parameter is applied is used to calculate a color difference signal for a plurality of pixels signals of an image captured by the image sensor without using infrared light of the predetermined infrared wavelength.

8. The signal processing device according to claim 1, wherein the parameter is determined based on spectral response characteristics of the image sensor.

9. The signal processing device according to claim 1, further comprising:
  the image sensor.

10. The signal processing device according to claim 1, wherein the circuitry is configured to receive the plurality of pixel signals output by a color difference sequential system from the image sensor.

11. A signal processing device comprising:
  circuitry configured to
    receive a plurality of pixel signals output from an image sensor on which light, which has passed through a color filter array including a plurality of primary color filters, is incident,
    convert the plurality of pixel signals into a luminance signal obtained by performing an addition process of the plurality of pixel signals, and
    convert the plurality of pixel signals into a color-difference signal obtained by performing a subtraction process between the plurality of pixel signals, wherein
    the plurality of pixels signals are converted into the color-difference signal using an equation to which a parameter to remove an infrared light component of a predetermined infrared wavelength is applied, and
    by standardizing each of signal intensity values of the plurality of pixel signals output from the image sensor such that a signal intensity ratio of the plurality of pixel signals in the predetermined infrared wavelength is equated to a sensitivity ratio of the plurality of primary color filters in the predetermined infrared wavelength, the parameter is set to a value to remove the infrared light component of the predetermined infrared wavelength in the equation based on each of the standardized signal intensity values.

12. The signal processing device according to claim 11, wherein the equation to which the parameter is applied is used to calculate a color difference signal for a plurality of pixels signals of an image captured by the image sensor without using infrared light of the predetermined infrared wavelength.

13. The signal processing device according to claim 11, wherein the parameter is determined based on spectral response characteristics of the image sensor.

14. The signal processing device according to claim 11, further comprising:
the image sensor.

15. A signal processing method comprising:
receiving a plurality of pixel signals output from an image sensor on which light, having passed through a color filter array including a plurality of complementary color filters, is incident;
setting, by circuitry of a signal processing device, a parameter to remove an infrared light component of a predetermined infrared wavelength in an equation to calculate a color-difference signal from the plurality of pixel signals;
calculating a luminance signal obtained by performing an addition process of the plurality of pixel signals; and
calculating, by the circuitry of the signal processing device, the color-difference signal obtained by performing a subtraction process between the plurality of pixel signals, using the equation to which the parameter is applied, wherein
by standardizing each of signal intensity values of the plurality of pixel signals output from the image sensor such that a signal intensity ratio of the plurality of pixel signals in the predetermined infrared wavelength is equated to a sensitivity ratio of the plurality of complementary color filters in the predetermined infrared wavelength, the parameter is set to a value to remove the infrared light component of the predetermined infrared wavelength in the equation based on each of the standardized signal intensity values.

16. A signal processing method comprising:
receiving a plurality of pixel signals output from an image sensor on which light, having passed through a color filter array including a plurality of primary color filters, is incident;
setting a parameter to remove an infrared light component of a predetermined infrared wavelength in an equation to calculate a color-difference signal from the plurality of pixel signals;
converting the plurality of pixel signals to a luminance signal obtained by performing an addition process of the plurality of pixel signals; and
converting the plurality of pixel signals into the color-difference signal obtained by performing a subtraction process between the plurality of pixel signals, using the equation to which the parameter is applied, wherein
by standardizing each of signal intensity values of the plurality of pixel signals output from the image sensor such that a signal intensity ratio of the plurality of pixel signals in the predetermined infrared wavelength is equated to a sensitivity ratio of the plurality of primary color filters in the predetermined infrared wavelength, the parameter is set to a value to remove the infrared light component of the predetermined infrared wavelength in the equation based on each of the standardized signal intensity values.

17. A non-transitory computer-readable medium storing instructions which when executed by a computer cause the computer to:
receive a plurality of pixel signals output from an image sensor on which light, having passed through a color filter array including a plurality of complementary color filters, is incident;
set a parameter to remove an infrared light component of a predetermined infrared wavelength in an equation to calculate a color-difference signal from the plurality of pixel signals;
calculate a luminance signal obtained by performing an addition process of the plurality of pixel signals; and
calculate the color-difference signal obtained by performing a subtraction process between the plurality of pixel signals, using the equation to which the parameter is applied, wherein
by standardizing each of signal intensity values of the plurality of pixel signals output from the image sensor such that a signal intensity ratio of the plurality of pixel signals in the predetermined infrared wavelength is equated to a sensitivity ratio of the plurality of complementary color filters in the predetermined infrared wavelength, the parameter is set to a value to remove the infrared light component of the predetermined infrared wavelength in the equation based on each of the standardized signal intensity values.

18. A non-transitory computer-readable medium storing instructions which when executed by a computer cause the computer to:
receive a plurality of pixel signals output from an image sensor on which light, having passed through a color filter array including a plurality of primary color filters, is incident;
set a parameter to remove an infrared light component of a predetermined infrared wavelength in an equation to calculate a color-difference signal from the plurality of pixel signals;
convert the plurality of pixel signals to a luminance signal obtained by performing an addition process of the plurality of pixel signals; and
convert the plurality of pixel signals to the color-difference signal obtained by performing a subtraction process between the plurality of pixel signals, using the equation to which the parameter is applied, wherein
by standardizing each of signal intensity values of the plurality of pixel signals output from the image sensor such that a signal intensity ratio of the plurality of pixel signals in the predetermined infrared wavelength is equated to a sensitivity ratio of the plurality of primary color filters in the predetermined infrared wavelength, the parameter is set to a value to remove the infrared light component of the predetermined infrared wavelength in the equation based on each of the standardized signal intensity values.

* * * * *